(12) United States Patent
Alisafaee et al.

(10) Patent No.: US 10,569,693 B2
(45) Date of Patent: Feb. 25, 2020

(54) ELECTRIC LAMP HAVING A COVER WITH A LIGHT GUIDE

(71) Applicant: Grote Industries, Inc., Madison, IN (US)

(72) Inventors: Hossein Alisafaee, Madison, IN (US); Chris Billman, Madison, IN (US); Travis Demaree, Canaan, IN (US); Cesar Perez-Bolivar, Madison, IN (US)

(73) Assignee: Grote Industries, Inc., Madison, IN (US)

( * ) Notice: Subject to any disclaimer, the term of this patent is extended or adjusted under 35 U.S.C. 154(b) by 89 days.

(21) Appl. No.: 15/609,850

(22) Filed: May 31, 2017

(65) Prior Publication Data

US 2018/0345846 A1 Dec. 6, 2018

(51) Int. Cl.
| | |
|---|---|
| *B60Q 1/00* | (2006.01) |
| *B60Q 1/32* | (2006.01) |
| *F21V 7/00* | (2006.01) |
| *F21V 3/00* | (2015.01) |
| *F21K 9/61* | (2016.01) |
| *F21V 3/06* | (2018.01) |
| *F21S 43/247* | (2018.01) |

(Continued)

(52) U.S. Cl.
CPC .............. *B60Q 1/0011* (2013.01); *B60Q 1/32* (2013.01); *F21K 9/61* (2016.08); *F21S 43/14* (2018.01); *F21S 43/236* (2018.01); *F21S 43/239* (2018.01); *F21S 43/241* (2018.01); *F21S 43/245* (2018.01); *F21S 43/247* (2018.01); *F21S 43/249* (2018.01); *F21S 43/26* (2018.01); *F21S 43/31* (2018.01); *F21V 3/00* (2013.01); *F21V 3/062* (2018.02); *F21V 7/0091* (2013.01); *B60Q 2400/20* (2013.01); *F21W 2103/00* (2018.01); *F21W 2103/15* (2018.01); *F21Y 2115/10* (2016.08)

(58) Field of Classification Search
CPC ........................... B60Q 2400/20; F21S 43/236
See application file for complete search history.

(56) References Cited

U.S. PATENT DOCUMENTS 5,897,196 A * 4/1999 Soskind .................. F21S 41/28
362/507
D417,298 S 11/1999 Paffrath et al.
(Continued)

FOREIGN PATENT DOCUMENTS

DE 20 2015 104310 U1 10/2015
EP 0 780 265 A2 6/1997
(Continued)

OTHER PUBLICATIONS

English Abstract of DE 20 2015 104310 U1 obtained from the European Patent Office (patent translate) on Sep. 24, 2018.
(Continued)

*Primary Examiner* — Joseph L Williams
*Assistant Examiner* — Jacob R Stern
(74) *Attorney, Agent, or Firm* — Woodard, Emhardt, Henry, Reeves & Wagner, LLP

(57) ABSTRACT

An electric powered lamp is disclosed. The lamp has a base, a light emitting element, and a cover over the light source. A light guide carries light from the light source to a reflective surface in the cover. Light rays run transversely through the cover.

17 Claims, 7 Drawing Sheets

(51) Int. Cl.

| | | |
|---|---|---|
| *F21S 43/14* | (2018.01) | |
| *F21S 43/245* | (2018.01) | |
| *F21S 43/239* | (2018.01) | |
| *F21S 43/249* | (2018.01) | |
| *F21S 43/241* | (2018.01) | |
| *F21S 43/31* | (2018.01) | |
| *F21S 43/236* | (2018.01) | |
| *F21S 43/20* | (2018.01) | |
| *F21W 103/00* | (2018.01) | |
| *F21Y 115/10* | (2016.01) | |
| *F21W 103/15* | (2018.01) | |

(56) References Cited

U.S. PATENT DOCUMENTS

| | | | |
|---|---|---|---|
| 6,097,549 A * | 8/2000 | Jenkins | B60Q 1/302 359/726 |
| 6,367,941 B2 | 4/2002 | Lea et al. | |
| D511,584 S | 11/2005 | Lin | |
| 7,177,097 B2 | 2/2007 | Lim et al. | |
| D545,981 S | 7/2007 | Main et al. | |
| D562,477 S | 2/2008 | Hsu | |
| D598,589 S | 8/2009 | Kasai | |
| D632,814 S | 2/2011 | Chang | |
| 7,922,369 B2 | 4/2011 | Condon et al. | |
| 8,061,880 B2 | 11/2011 | Lambert et al. | |
| 8,398,283 B2 | 3/2013 | Lambert et al. | |
| D686,360 S | 7/2013 | Davis | |
| 8,672,524 B2 | 3/2014 | Cha et al. | |
| 8,702,288 B2 | 4/2014 | Brown | |
| 8,840,289 B2 | 9/2014 | Lindsay et al. | |
| 9,452,707 B1 | 9/2016 | Tsai | |
| 2010/0246200 A1 | 9/2010 | Tessnow et al. | |
| 2014/0049975 A1 | 2/2014 | Lee et al. | |
| 2015/0241616 A1 | 8/2015 | Bungenstock | |
| 2015/0330593 A1 | 11/2015 | Larsen et al. | |
| 2015/0338048 A1 | 11/2015 | Ahn et al. | |
| 2016/0040850 A1 | 2/2016 | Orisich et al. | |
| 2016/0076732 A1 * | 3/2016 | Kim | H01L 33/54 362/327 |
| 2016/0131322 A1 | 5/2016 | Chen | |
| 2016/0195234 A1 | 7/2016 | Mateju et al. | |

FOREIGN PATENT DOCUMENTS

| | | |
|---|---|---|
| GB | 2 489 813 A | 10/2012 |
| WO | WO 2005/001332 | 1/2005 |

OTHER PUBLICATIONS

Engiish Abstract of EP 0 780 265 A2 obtained from the European Patent Office (patent translate) on Sep. 24, 2018.

Search Report and Written Opinion in International Application No. PCT/US2018/035003, dated Sep. 3, 2018, 14 pages.

* cited by examiner

ELECTRIC LAMP HAVING A COVER WITH A LIGHT GUIDE

BACKGROUND

The present invention relates to electric lamps, and more specifically to covers therefore which direct light.

Lamps, such as LED lamps, are used for a variety of applications, including for example vehicular lamps. Such include side marker lamps used on truck cabs and trailers and otherwise. For light design reasons (which may include aesthetics, regulatory compliance, or otherwise) cover lensing, such as Fresnel lensing or otherwise is used to direct light rays in certain directions and/or to provide illumination across various areas of the lamp cover. Oftentimes this can involve considerable engineering that can require substantially different designs and layouts depending on lamp size, illumination needs and otherwise.

One object is to provide an improved lamp and an improved cover design. This may include a relatively simple design which can be scaled to different sizes and layouts using a similar structure and/or using a similar base/light source.

SUMMARY

The claims, and only the claims, define the invention. The invention may be an electric powered lamp, comprising a base, an light emitting element, and a cover over the light source is disclosed. The electric powered lamp has the light source mounted, directly or indirectly, on the base with the light source pointing generally outward in a Z-axis direction that is generally perpendicular to the base.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
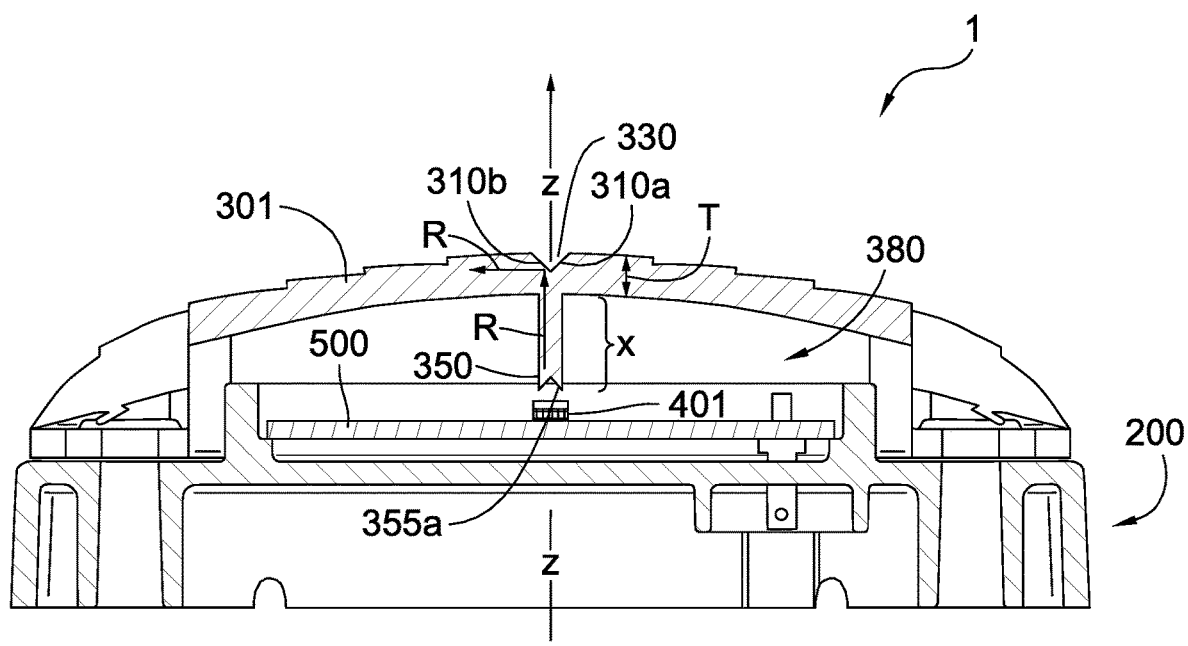
FIG. 1 is a side cross-section view of one example of the invention.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Referring to the examples shown in the drawings (FIGS. 1-2), an electric powered lamp 1, comprising a base 200, an light emitting element 401, and a cover 301 over the light source are shown. Example light rays are denoted by "R" (see e.g. FIGS. 1, 3A, 4-6). The drawings also comprise the light source being mounted, directly or indirectly, on said base with said light source pointing generally outward in a Z-axis direction that is generally perpendicular to said base. FIGS. 3A-3I and 4 show examples of other covers 302, 303, 304, 305 and 306; and, they also show various numbers and arrangements of light sources such as 401, 402, 403 and 404.

The cover is light-transmissive plastic material wherein the cover forms a cavity thereunder (see e.g. cavity 380 in FIG. 1) between the cover and the base; the cover has a light guide 351, or 352, 353 (see FIG. 4), extending downward through the cavity, generally along said Z-axis, and toward the light source; and, the cover has a light reflective surface 310a located at an upper portion of said light guide and angled to (i) reflect, (ii) refract, or (iii) reflect and refract: light rays emanating from the light source and through the light guide at angles generally transverse to said Z-axis with such light rays thereafter travelling generally transversely through the cover plastic material before exiting the cover.

Light sources may be a single color or different colors. For example, in FIG. 3B, light source 401 could be amber or yellow with light source 402 could be red. They may be activated separately, such that if the light-transmissive material of cover 302, including unitary light guide 351 may be clear or non-tinted. Then, activation of red source 402 results in red light exiting the lamp, whereas instead activation of amber or yellow source 401 results in white light from the lamp. Other colors, such as white or otherwise, may be used. And three or more may be used in combination. Or, for example in FIG. 3A both light sources 401 may be the same color; and, they may be activated separately or together to give brighter lumen illumination.

The lamp optionally may include the feature where the reflective surface is formed in the plastic material, such as shown with reflective surfaces 310a, 310b, 310c and/or 310d being molded surfaces of the cover. The lamp optionally may include the feature where the light guide is formed from the plastic material as a unitary portion of said cover.

Figure 2:
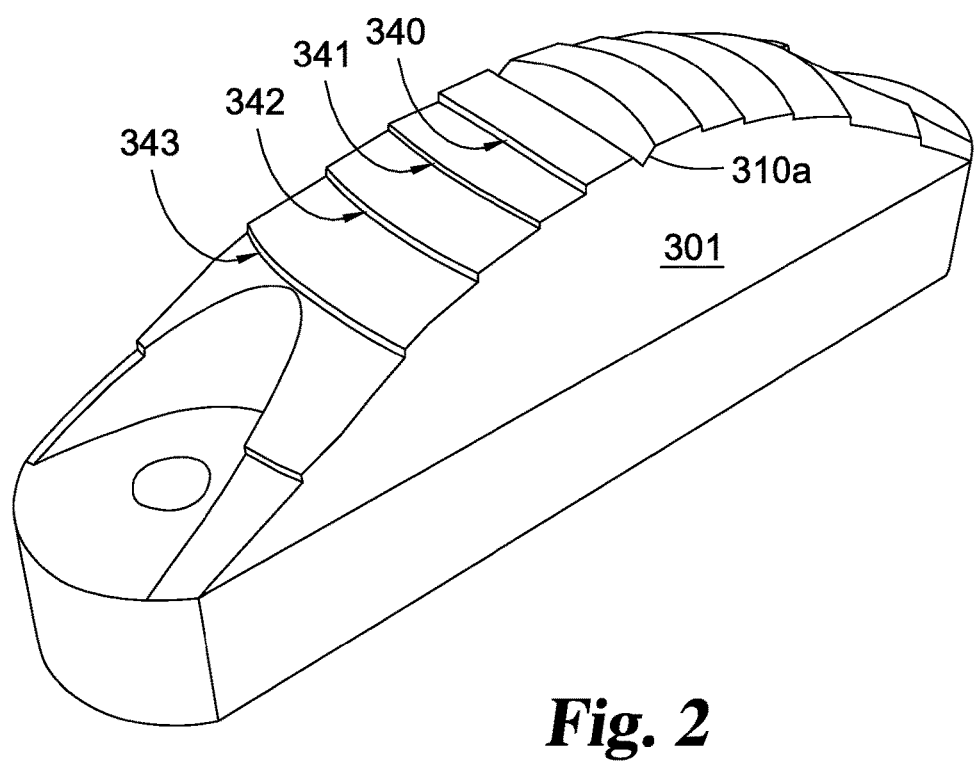
FIG. 2 is a top perspective view of the device of FIG. 1.
Figure 3A:
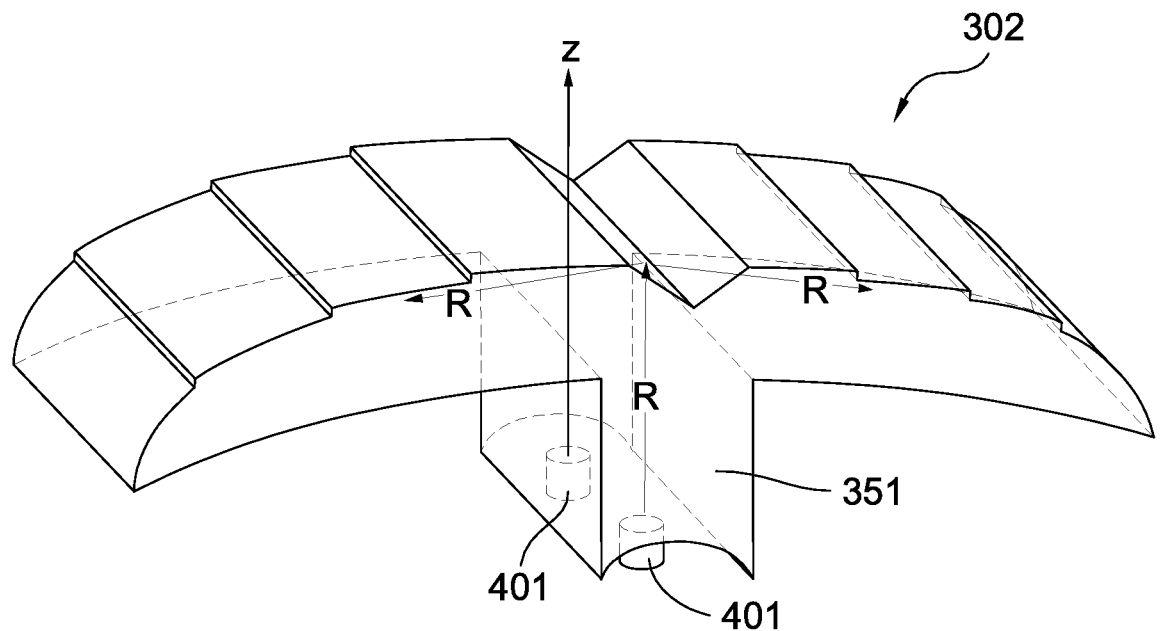
FIGS. 3A-3I are various top perspective views of a variety of examples of covers and light sources.
Figure 3B:
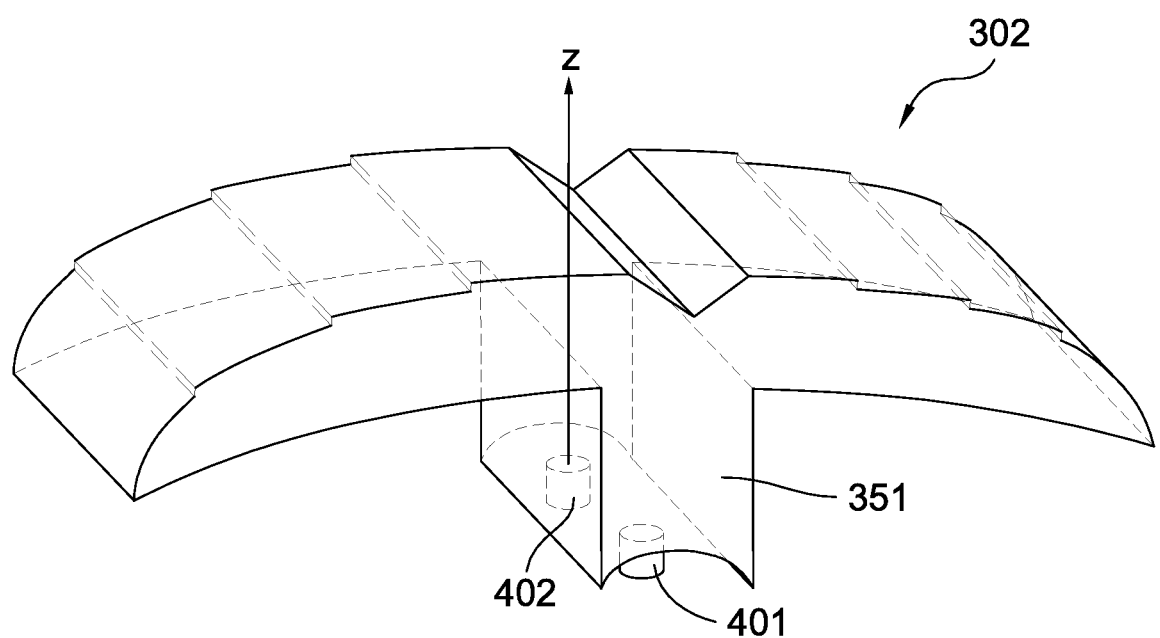
Figure 3C:
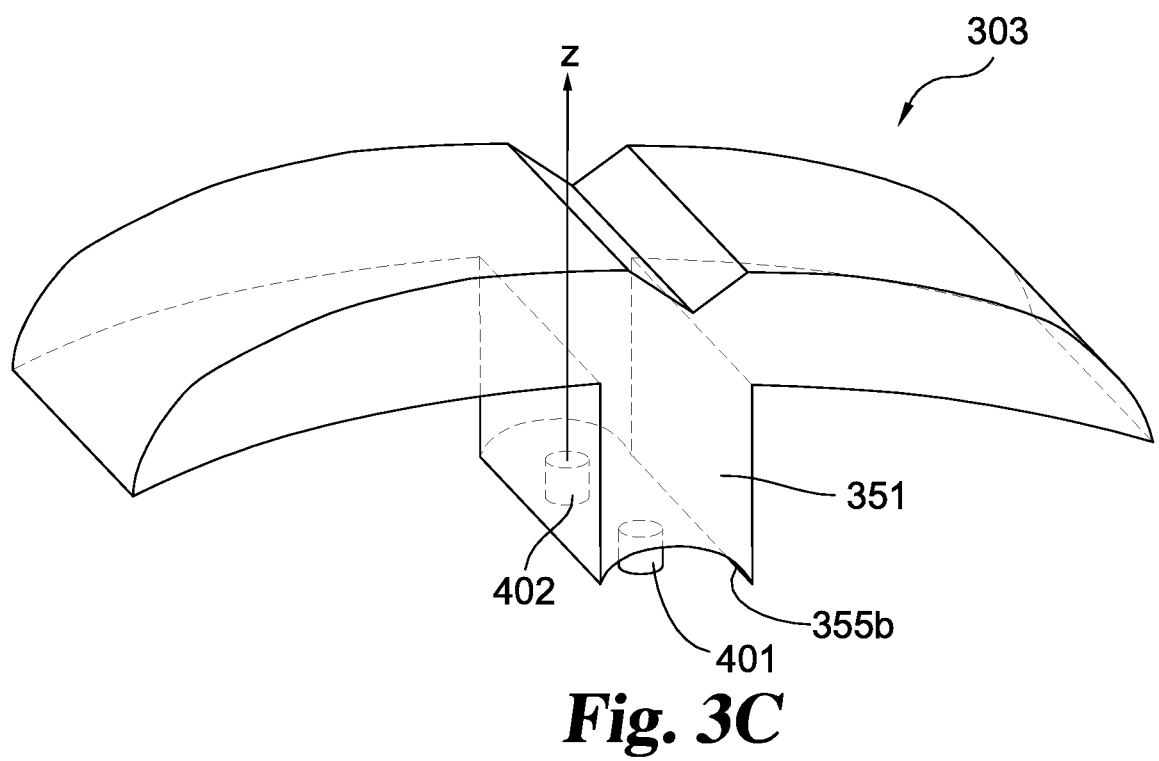
Figure 3D:
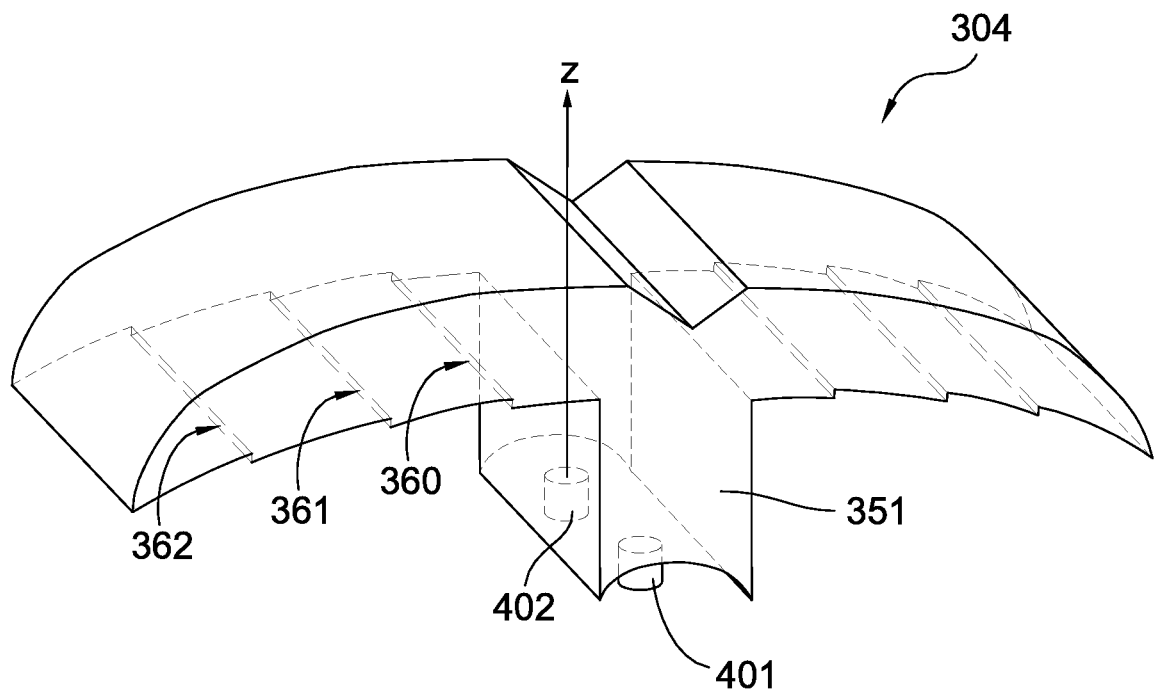
Figure 3E:
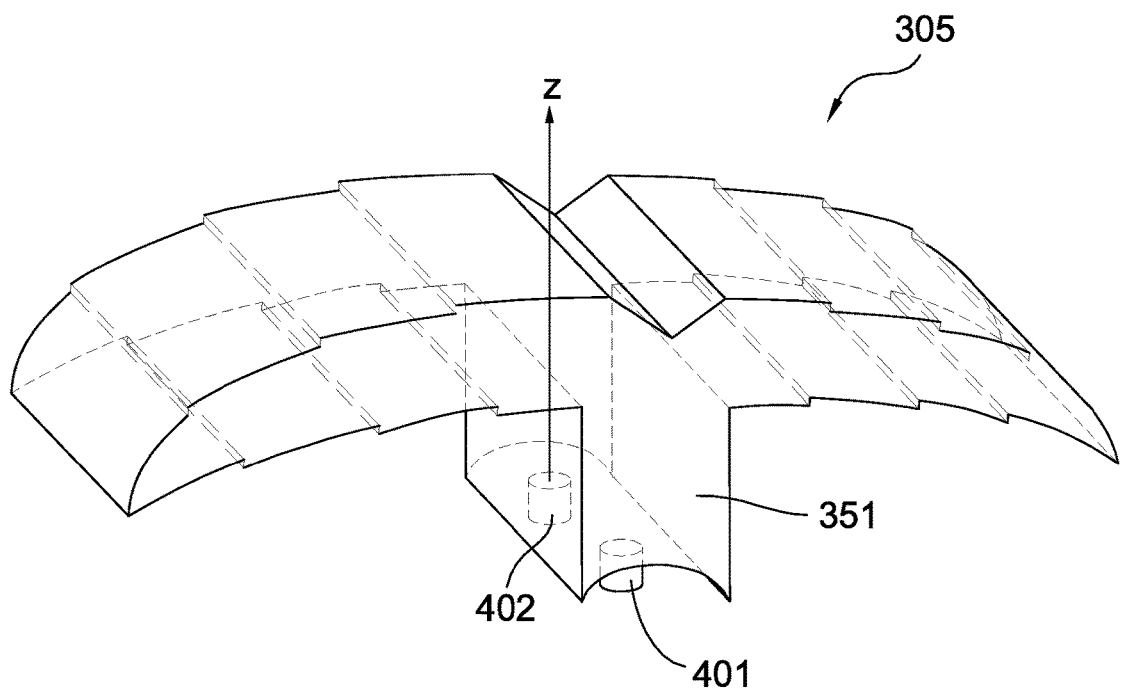
Figure 3F:
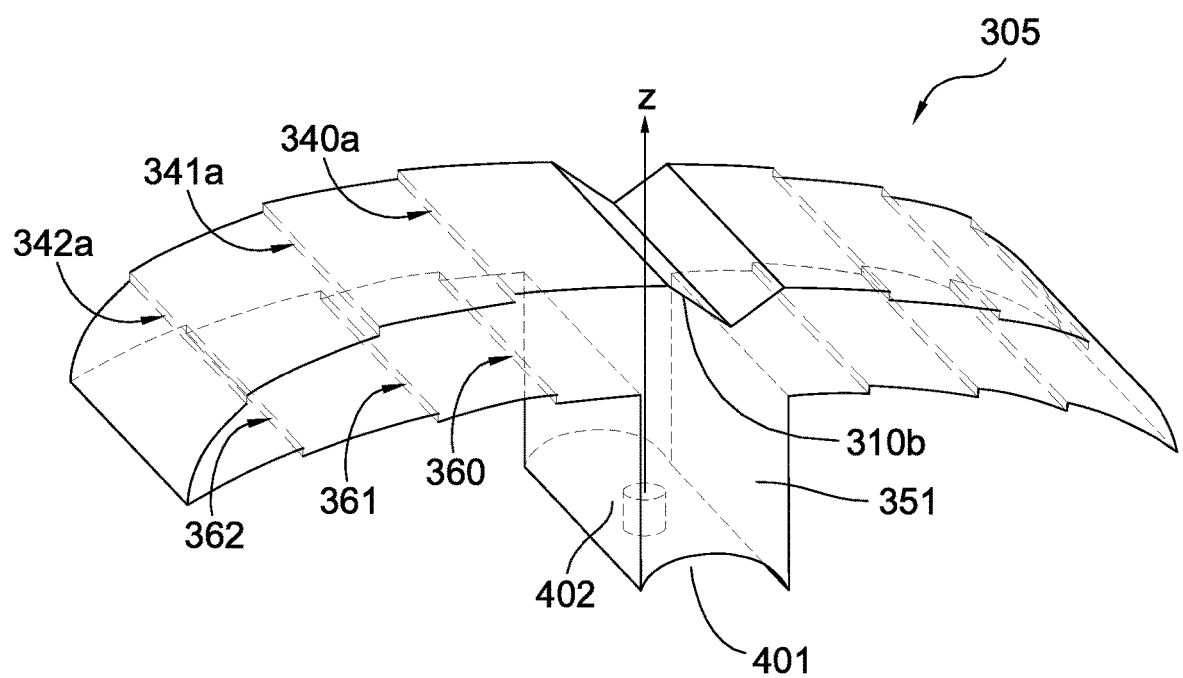
Figure 3G:
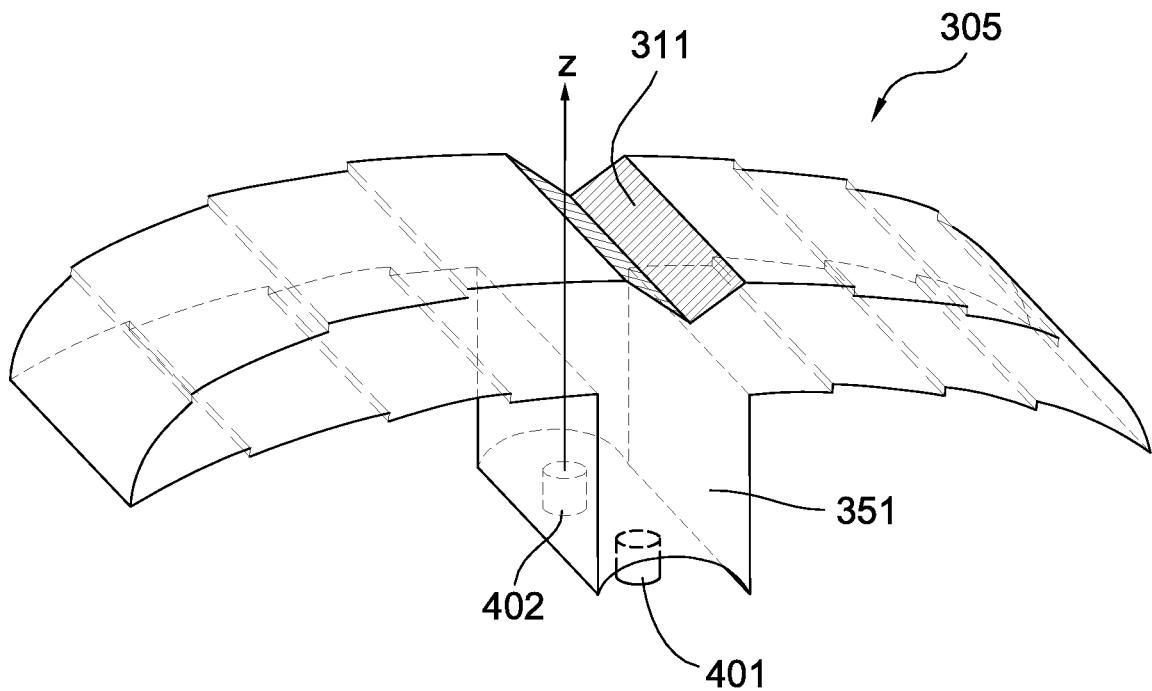
Figure 3H:
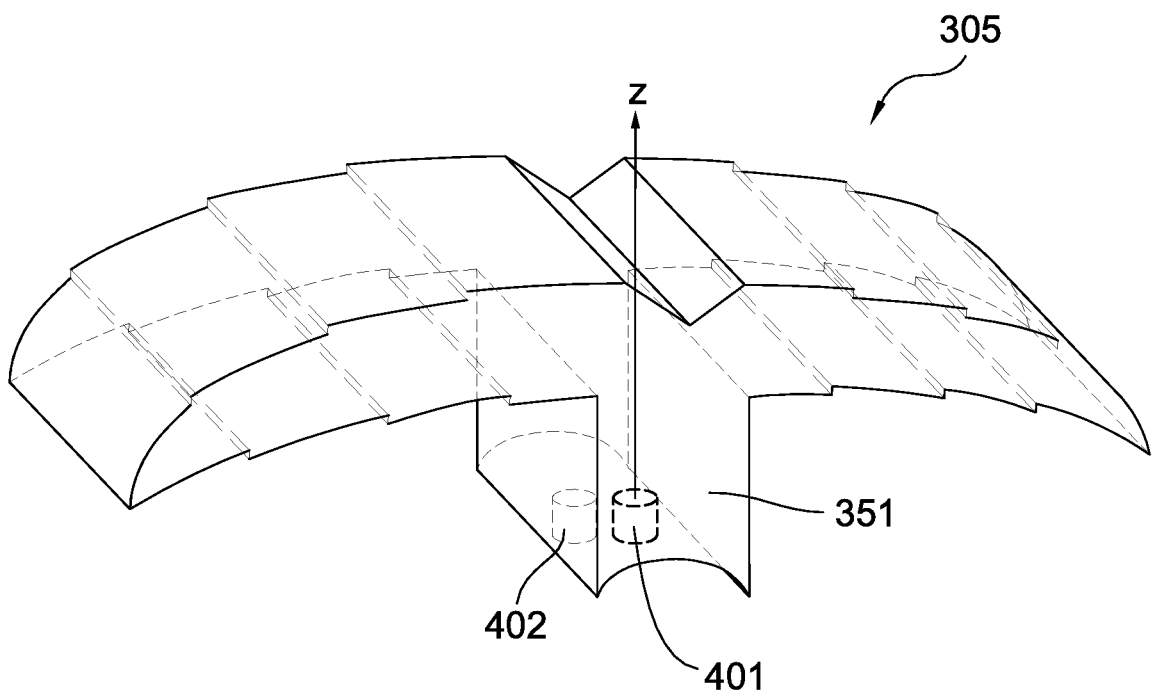
Figure 3I:
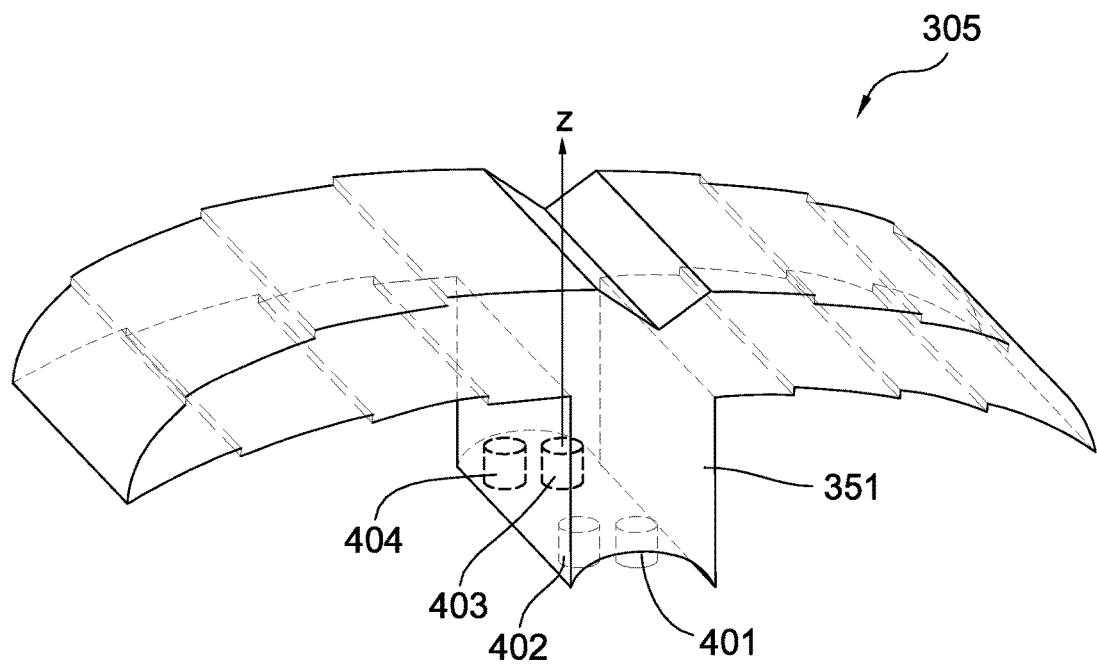

The lamp optionally may include the feature where the cover has at least one facet surface being generally parallel to the Z-axis and providing a generally transverse exit for light rays travelling transversely through the cover plastic material. Examples are shown as facets 340, 341, 342 and/or 342 along a top, outer side of the cover (FIG. 2), facets 360, 361 and/or 362 within or on a bottom of the cover (FIG. 3D), and/or a combination of those shown as facets 340a, 341a, 342a with 360, 361 and 362 (FIG. 3F). Or, the surfaces may be smooth, such as cover 303 or 304. Or, roughen surfaces and/or Fresnel lensing may be used.

The lamp optionally may include the feature where the reflective surface comprises a two-plane V-shape, such as for example as formed by reflective surfaces 310a and 310b in FIG. 1. Although as shown in FIG. 2 such V-shape may be a trough and may run the entire width of the cover, it may optionally only run a portion of such width. Also, the reflective surfaces may be planar, as shown, but also may be curved or multi-faceted reflective surfaces.

Optionally some or all of the reflective surface may be an imbedded or painted or printed surface 311 (FIG. 3G) on or molded in the cover.

Figure 5:
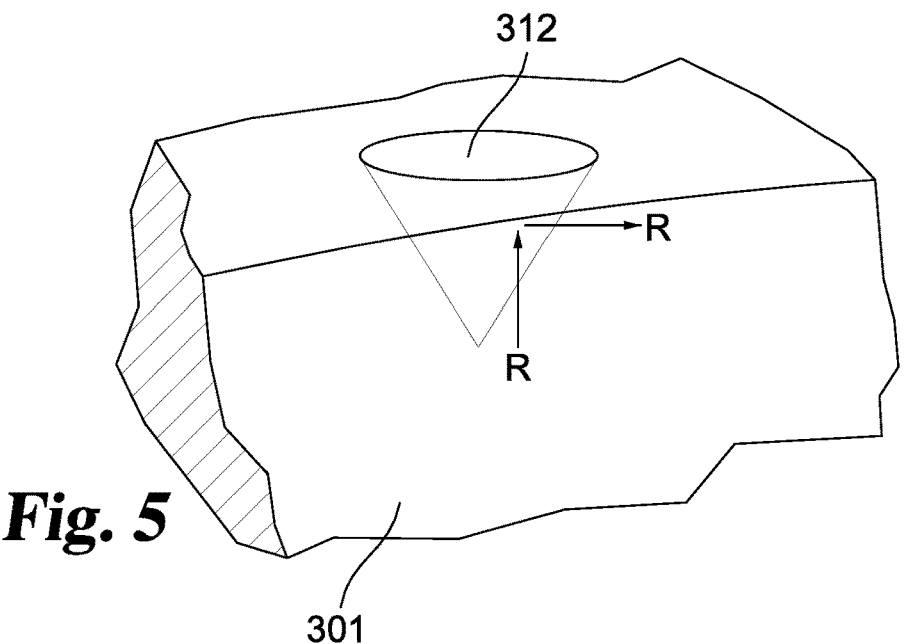
FIG. 5 is a partial perspective of a cone shaped reflective surface.
Figure 6:
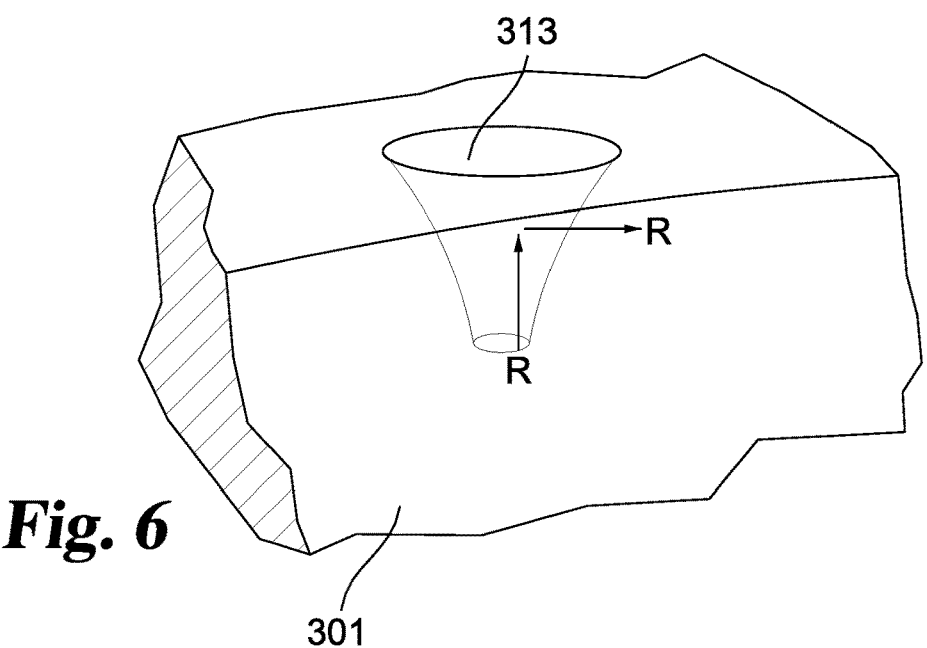
FIG. 6 is a partial perspective of a flared cone shaped reflective surface.

The lamp optionally may include the feature where the reflective surface comprises a cone shape, such as cone shaped surface 312 in FIG. 5 with rays R reflecting off of it. Or, the lamp optionally may include the feature where the reflective surface comprises a flat plane, or both. The lamp optionally may include the feature where the reflective surface comprises a flared cone shape, such as flared cone surface 313 in FIG. 6 with rays R reflecting off of it.

The lamp optionally may include the feature where the light guide has a lower comprising a concave lens (355*a* in FIG. 1 or 355*b* in FIG. 3C) located directly over said light source. The light guide may be longer, such as length X (FIG. 1) than it is wide. Length X is preferably at least 2 mm, and may optionally longer such as 5 mm long, 7 mm long, 10 mm long, or longer. Preferably, the bottom of the light guide is close to the light source, such as less than 5 mm, or less than 2 mm, or less than 1 mm, or optionally even in contact with the light source (see e.g. FIG. 1).

Figure 4:
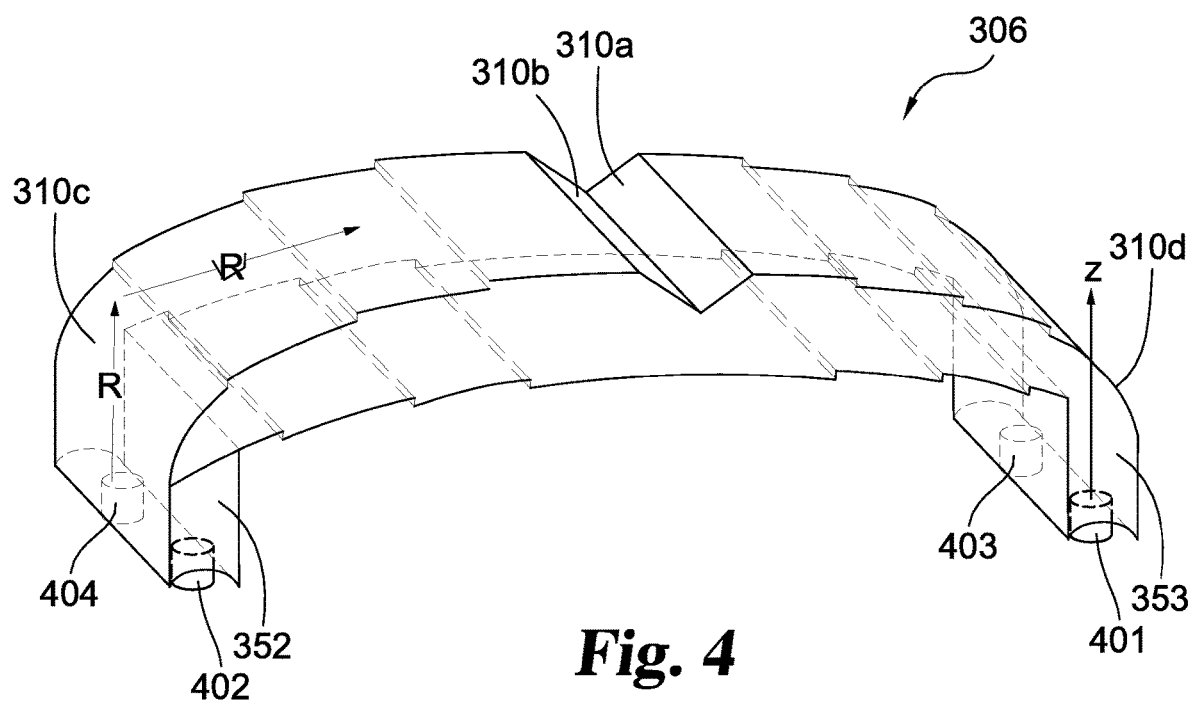
FIG. 4 is a top perspective view of another of example of a cover and light sources.

There may be one light guide (FIG. 1) or two or more light guides 352, 352 (FIG. 4). The light guide(s) may be in the center of the lamp, at its peripheral edge (FIG. 4), in an intermediate region, and/or combinations thereof.

The lamp optionally may include the feature where the cover adjacent to said reflective surface has a thickness T (see e.g. FIG. 1), and wherein said reflective surface extends across (deep into the thickness) at least about two millimeters deep into said thickness.

The lamp optionally may include the feature where the cover is generally dome-shaped with a zenith 330 (FIG. 1) above said light source, and wherein the cover has a plurality of stair-stepped facets stepping downward from said zenith with the facets providing a generally transverse exit for light rays travelling transversely through the cover plastic material.

Figure 7:
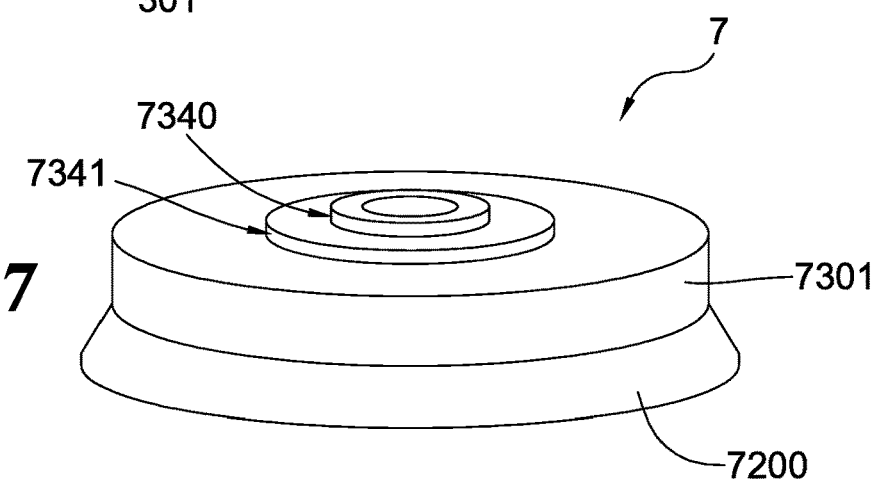
FIG. 7 is a perspective view of an alternative lamp.

The lamp optionally may include the feature where the lamp is a vehicular side marker lamp, such as shown as lamp 1 in FIGS. 1 and 2. It may be some other lamp, such as for example a vehicle lamp. It may optionally be an STT lamp. For example, FIG. 7 shows a 4-inch round diameter STT lamp 7 with cover 7301 and base 7200, and ring shaped facets 7340 and 7341. There is a cavity underneath cover 7301 and 1, 2 3 or more light guides (not shown).

Some or all of those optional features may be combined or mixed and matched.

As used here (claims, specification, and other definitions) the following terms have the following meaning:

Articles and phases such as, "the", "a", "an", "at least one", and "a first", "comprising", "having" and "including" here are not limited to mean only one, but rather are inclusive and open ended to also include, optionally, two or more of such elements and/or other elements. In terms of the meaning of words or terms or phrases herein, literal differences therein are not superfluous and have different meaning, and are not to be synonymous with words or terms or phrases in the same or other claims.

The term "and/or" is inclusive here, meaning "and" as well as "or". For example, "P and/or Q" encompasses, P, Q, and P with Q; and, such "P and/or Q" may include other elements as well.

The term "base" as used herein has the meaning, a structure that the light source may be mounted, directly (or indirectly such as via a circuit board 500 (FIG. 1) or otherwise).

The term "cavity" as used herein has the meaning, a space under a cover, typically filled with air although optionally having potting.

The term "cover" as used herein has the meaning, a light transmission part that is over some or all of the light source and/or base.

The term "light emitting element" as used herein has the meaning, a component that converts electrical energy into visible light energy, infrared light energy and/or ultraviolet such as by LEDs, incandescent lamps, graphene, silicene, or otherwise. Light emitting elements emitting infrared light energy may have use, for example, in military vehicle applications.

The term "exit for light rays" as used herein has the meaning, one or more locations in the cover where light rays leave the cover and enter the surrounding environment.

The term "facet" as used herein has the meaning, a face (planar, curved, complex) in a cover or reflector.

The term "generally parallel" as used herein has the meaning, exactly parallel as well as plus/minus thirty degrees.

The term "generally perpendicular" as used herein has the meaning, exactly perpendicular (90 degrees) as well as plus/minus thirty degrees.

The term "generally transverse" as used herein has the meaning of generally perpendicular but also includes that in a planar sense, namely may include such generally perpendicular attribute in both a X direction and a Y direction (relative to Z-axis).

The term "light guide" as used herein has the meaning, a conduit of light-transmissive material that carries light rays within it from one location to another. It may be elongated or cylindrical or rectangular or otherwise. It may be a light pipe (longer than its average cross-sectional (circular, elliptical, square or other cross-sectional shape(s) diameter or other width, or a non-light pipe.

The term "light-transmissive" as used herein has the meaning, clear (whether or not color tinted), translucent and/or otherwise such that visible light or infrared light or ultraviolet passes through it.

The term "plane" as used herein has the meaning, a flat surface.

The term "plastic" as used herein has the meaning, polymer or monomer material.

The term "reflect" as used herein has the meaning, to bounce some or all light rays off a surface or facet.

The term "refract" as used herein has the meaning, to redirect some or all light rays through a surface or facet.

The term "unitary" as used herein has the meaning, two or more components or features made from the same, contiguous material.

The term "Z-axis" as used herein has the meaning, a direction as shown in the drawing figures, generally normal to the base and outward.

The term "zenith" as used herein has the meaning, the highest or most outward location along the Z-axis.

The term "FMVSS 108 compliant" here means, meeting the candela, illuminated surface area and other requirements set forth by U.S. 49 C.F.R. § 571.108.

The term "Canada Motor Vehicle Safety Standard" here means, meeting the vehicle lamp requirements set forth by Canada's C.R.C., c. 1038 (Schedule IV).

The term "Illuminated surface area" here means, per 49 C.F.R. § 571.108, the effective projected luminous lens area (EPLLA), which means the area of the orthogonal projection of the effective light-emitting surface of a lamp on a plane perpendicular to a defined direction relative to the axis of reference. Unless otherwise specified, the direction is coincident with the axis of reference, namely here the Z-axis.

The term "LED" here means light emitting diode, including single diodes as well as arrays of LED's and/or grouped light emitting diodes. This can include the die and/or and LED film or other laminate, LED packages, said packages may include encapsulating material around a die, and the material, typically transparent, may or may not have color tinting and/or may or may not have a colored sub-cover. An LED can be a variety of colors, shapes, sizes and designs, including with or without heat sinking, lenses, or reflectors, built into a package.

The term "light" and "light ray" here means light (and rays thereof) which is visible to the naked human eye.

The terms "stop-tail-turn" lamp (or "STT") here means a lamp which is compliant with present legal and/or regulatory requirements in this country such as illuminated surface area, candela, and otherwise. This includes being compliant with Canada Motor Vehicle Safety Standard, compliant with FMVSS 108, or both.

The term "truck" here means a powered truck (also known as a tractor or cab) for pulling a trailer.

The term "vehicle" here means a self-propelled or towed device for transportation, including without limitation, car, truck, bus, boat, tank or other military vehicle, airplane, truck trailer, truck cab, boat trailer, other trailer, emergency vehicle, and motorcycle.

The language used in the claims and the written description and in the above definitions is to only have its plain and ordinary meaning, except for terms explicitly defined above. Such plain and ordinary meaning is defined here as inclusive of all consistent dictionary definitions from the most recently published (on the filing date of this document) general purpose Webster's dictionaries and Random House dictionaries.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. An electric powered vehicle marker lamp, comprising:
   A base for said vehicle marker lamp, a light source, and a cover over the light source;
   Said light source being mounted, directly or indirectly, on said base with said light source pointing generally outward in a Z-axis direction that is generally perpendicular to said base;
   Said cover being light-transmissive plastic material wherein:
   a) Said cover forms a cavity thereunder between said cover and said base;
   b) Said cover has a light guide extending downward through said cavity from an inside surface of said cover, generally along said Z-axis, and toward said light source, said cover defining a plurality of stair-stepped facets on an outside surface of said cover, said facets providing a generally transverse exit for light rays travelling transversely through said cover plastic material; and,
   c) Said cover defining a light reflective surface on an outside surface of said cover, said light reflective surface comprising a trough in said cover and located at an upper portion of said light guide and angled to (i) reflect, (ii) refract, or (iii) reflect and refract: light rays emanating from said light source and through said light guide at angles generally transverse to said Z-axis, said light rays thereafter travelling generally transversely through said cover plastic material before exiting said cover.

2. The lamp of claim 1, wherein said reflective surface is formed in said plastic material.

3. The lamp of claim 2, wherein said light guide is formed from said plastic material as a unitary portion of said cover.

4. The lamp of claim 3, wherein said cover has at least one facet surface being generally parallel to said Z-axis and providing a generally transverse exit for light rays travelling transversely through said cover plastic material.

5. The lamp of claim 4, wherein said reflective surface comprises a two-plane V-shape.

6. The lamp of claim 5, wherein said light guide has a lower comprising a concave lens located directly over said light source.

7. The lamp of claim 6, wherein said cover adjacent to said reflective surface has a thickness, and wherein said reflective surface extends across at least about two millimeters deep into said thickness.

8. The lamp of claim 7, wherein said cover is generally dome-shaped with a zenith above said light source, and wherein said plurality of stair-stepped facets step downward from said zenith.

9. The lamp of claim 1, wherein said reflective surface comprises a two-plane V-shape.

10. The lamp of claim 1, wherein said reflective surface comprises at least one flat plane that extends an entire width of said cover.

11. The lamp of claim 1, wherein said light guide is molded from said plastic material as a unitary portion said cover and wherein said light guide extends downwardly and is a length that is longer than it is wide.

12. The lamp of claim 1, wherein said cover has at least one facet surface being generally parallel to said Z-axis and providing a generally transverse exit for light rays travelling transversely through said cover plastic material.

13. The lamp of claim 1, wherein said light guide extends a length below said cover at least 5 millimeters and has a lower comprising a concave lens located directly over said light source.

14. The lamp of claim 1, wherein said cover adjacent to said reflective surface has a thickness, and wherein said reflective surface extends across at least about two millimeters deep into said thickness.

15. The lamp of claim 1, wherein said cover is generally dome-shaped with a zenith above said light source, and wherein said cover has a plurality of stair-stepped facets stepping downward from said zenith with said facets providing a generally transverse exit for light rays travelling transversely through said cover plastic material.

16. An electric powered lamp, comprising:
   A base, a light source, and a cover over a light source;
   Said light source being mounted, directly or indirectly, on said base with said light source pointing generally outward in a Z-axis direction that is generally perpendicular to said base;
   Said cover being light-transmissive plastic material wherein:
   a) Said cover forms a cavity thereunder between said cover and said base;

b) Said cover has a light guide extending downward through said cavity from an inside surface of said cover at least 5 millimeters, generally along said Z-axis, and toward said light source, said light source comprising an LED mounted to a circuit board; and, c) Said cover is generally dome-shaped with a zenith above said light source, and wherein said cover has a plurality of stair-stepped facets stepping downward from said zenith with said facets providing a generally transverse exit for light rays travelling transversely through said cover plastic material.

17. The lamp of claim 1, wherein the reflective surface is a V-shaped trough running across the lamp cover.

* * * * *